March 31, 1970 R. D. LOWRY ET AL 3,503,626
TRAILER HITCH TONGUE AND MOVABLE JAW COUPLER ASSEMBLY
Filed March 26, 1968 2 Sheets-Sheet 1

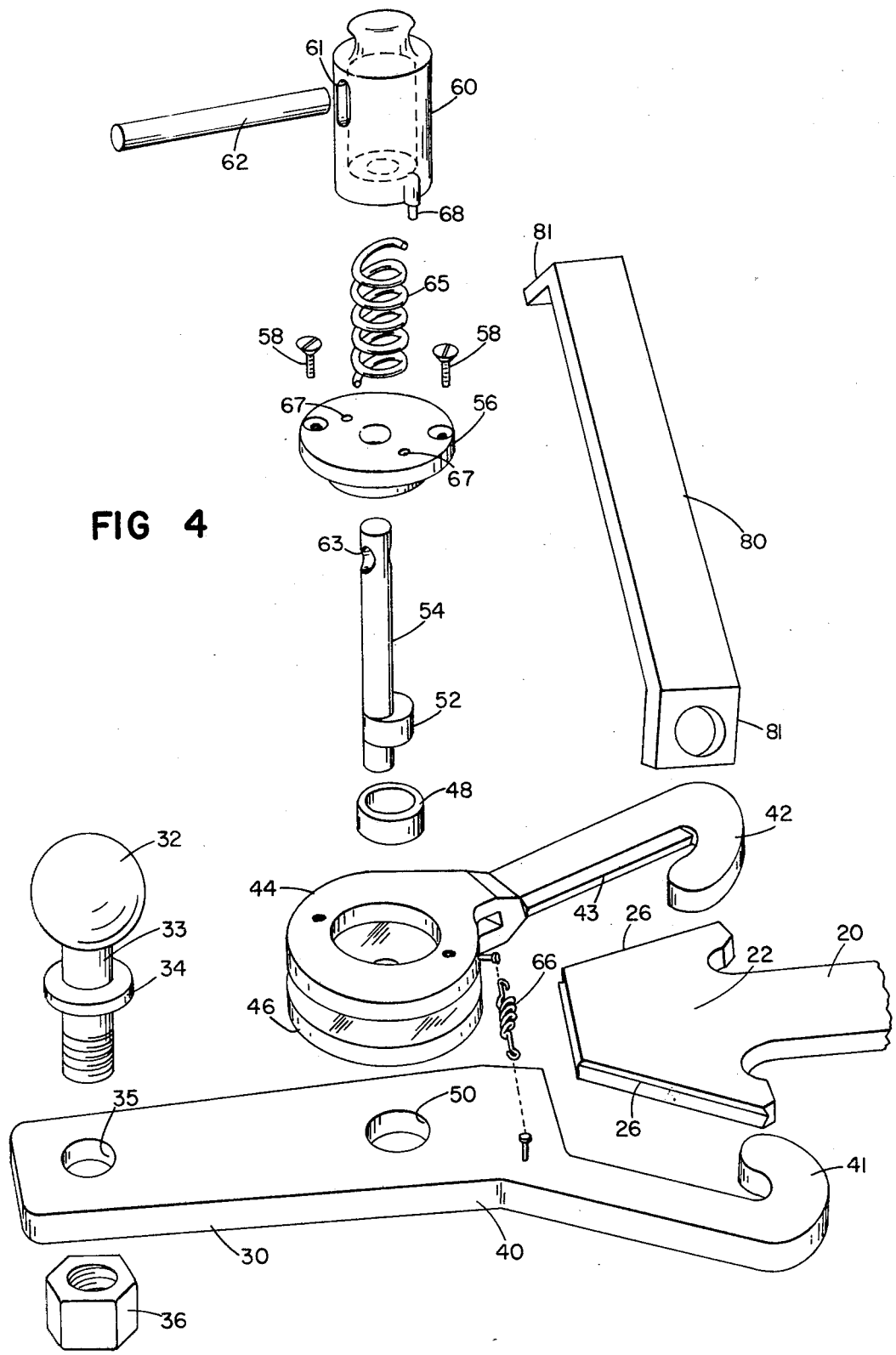

United States Patent Office 3,503,626
Patented Mar. 31, 1970

3,503,626
TRAILER HITCH TONGUE AND MOVABLE JAW
COUPLER ASSEMBLY
Robert D. Lowry and Russell B. Strout, Winchester, Mass., assignors to Lowry Development Corporation, Winchester, Mass., a corporation of Massachusetts
Filed Mar. 26, 1968, Ser. No. 716,100
Int. Cl. B60d 1/06, 1/00
U.S. Cl. 280—491                                    6 Claims

ABSTRACT OF THE DISCLOSURE

A trailer hitch has a short coupler for attachment to a tongue permanently mounted on the rear end of a driving vehicle and presenting on its rear portion the conventional ball for attachment of the trailer. The coupler is disengageable. The coupler has a fixed jaw and a moveable jaw with the latter being rotated into a locking position by a cam.

This invention relates to trailer hitches and more particularly to a hitch which does not permanently mount the conventional upstanding ball at the rear of an automobile or tractor, but mounts it rather on the rear end of a separate coupler which may be readily attached to and detached from a simple flat tongue which is permanently mounted on the rear end of the driving vehicle, which tongue need not extend much, if at all, beyond the normal rear end of the vehicle.

Present day trailer hitch accessories which carry a ball and are permanently attached to the driving vehicle have to extend far enough beyond the rear of the vehicle to permit the socket on the trailer bar to pass freely over the ball. Such an extension is dangerous to pedestrians, can be readily damaged in a rear end bump and may often be illegal under state laws when the upstanding ball visually obstructs a rear centrally mounted license plate when the trailer is not hitched.

In accordance with the present invention the ball, instead of being mounted on a permanently attached vehicle part, is mounted on a separate part which acts as a short coupler between a permanently mounted flat tongue on the driving vehicle and the socket of the trailer. The short coupler then may be readily removed and carried in the trunk or elsewhere in the vehicle when not in use, thus only leaving a non-obstrusive flat tongue at the rear of the car which is well below the license plate and does not visually block it from view.

A trailer hitch using such an unobstrusive tongue in assembly with a coupler of this invention is shown in the accompanying drawings wherein:

FIG. 4 is an exploded view showing the parts of the assembly.

Figure 1:
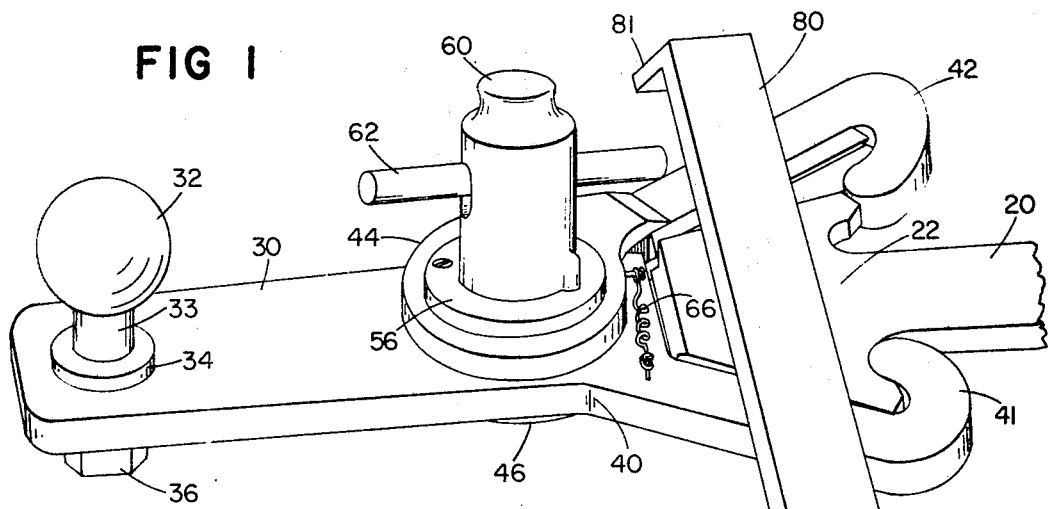
FIG. 1 is a perspective view of the tongue and coupler in a position while they are being assembled together.
Figure 2:
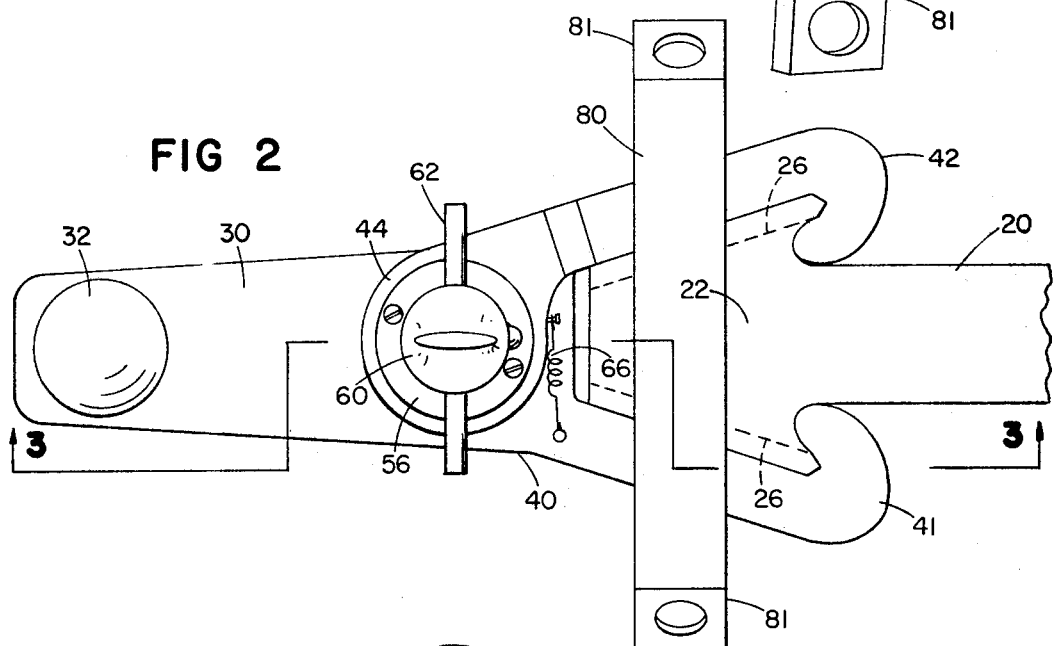
FIG. 2 is a plan view of the assembled device.

The tongue which is permanently attached to the vehicle is shown at 20 and has an enlarged rear heart-shaped barb-like portion 22 whose side edges 26 are grooved.

The coupler includes a rear section 30 on which is permanently mounted a conventional trailer hitch ball 32 which as shown in FIG. 4 may be carried on top of a pin 33 having an enlarged collar 34 and a screw threaded bottom end for insertion through a hole 35 in the rear section 30 and engagement by a nut 36.

The forward section 40 of the coupler terminates on one side in a fixed jaw 41 having an inner V-shaped edge to interlock with the groove in edge 24.

Figure 3:
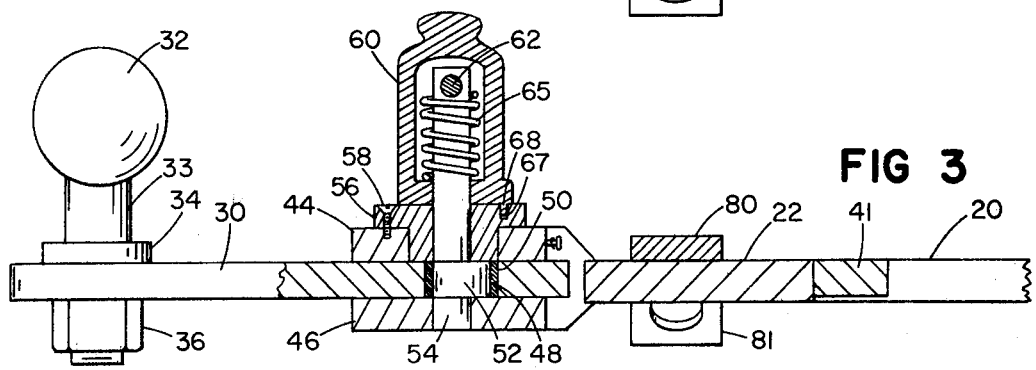
FIG. 3 is a cross sectional view of the device shown in FIG. 2 taken along the line 3—3 in FIG. 2.

An opposing forward movable jaw 42 has an inner V-shaped edge 43 which interlocks with a groove in the other tongue edge 26, but its rear end terminates in bifurcated upper and lower sections 44 and 46 respectively which are spaced apart a distance sufficient to permit the coupler 40 to be sandwiched between the sections, in which position it is held by a cam assembly, including a bushing 48 which, as shown in FIG. 3, is seated in an aperture 50 in the coupler 40 and surrounds a cam lobe 52 mounted on a cam shaft 54 whose lower end extends into a keeper hole in the bottom bifurcated section 46 of the jaw 42. A flanged cover plate 56 is screwed to the upper surface 44 of the jaw 42 by screws 58, the cam shaft shaft 54 extending upwardly through the cover plate and being capped with a hollow lock cover 60 which has side vertical slots 61 to accommodate a cross pin handle 62 which extends through the slots 61 and through a hole 63 in the top of the cam shaft 54.

The cap 60 is urged downwardly by a spring 65 seated between the cross pin 62 and a bottom shoulder of cap 60.

The movable jaw 42 is continuously urged toward the fixed jaw 41 by a spring 66 connected by pins to the two jaws.

The upper surface of the cap 56 is provided with two depressions 67, 67 to accommodate a pin 68 on the cap 60 when the cap and cam shaft are rotated with respect to the cover to approximately diametrically opposite positions.

Rotation of the cam shaft 54 will thus move the two jaws relative to one another against the spring 66 with a compound motion first moving it forwardly relative to and then away from the jaw 41.

The tongue 24 may also have affixed to its top surface, by welding or bolts, a cross yoke 80 with downwardly bent end portions 81 having apertures for affixing a safety chain.

In operation, therefore, the coupler member which may have been in the trunk of the car has its cam lock 60 lifted and the cam shaft is rotated to permit the movable jaw 42 to move outwardly as the coupler is pushed over the tongue 20. The fixed jaw 41 is hooked around the right front corner of the barb-like portion 22, and then, as the coupler is rotated into working position, the movable jaw 42 moves outwardly along the angled head of tongue 20 and its end is pulled in around the left front corner of the barb-like portion 22, and the cam is rotated to lock the jaws in closed position with the pin 68 seated in the other hole 67.

The socket of a trailer bar can then be readily attached over the ball 32.

The coupler may be readily detached from the tongue 20 by reversing the operation rotating the cam shaft in the opposite direction to release the jaws from their closed locked position.

Bushing 48 may be made of nylon or other resilient material to allow cam to move slightly more than that required to tighten, the elastic deformation then keeps the clamp tight for a much longer time after many thousand removals, allowing for wear during use.

What is claimed is:

1. A disengageable trailer hitch assembly comprising
a flat tongue having a generally heart-shaped rear portion and
a coupler including one fixed jaw and one movable jaw adapted to clamp over said heart-shaped tongue portion,
rotatable cam means engageable with said movable jaw for locking said movable jaw in closed position with respect to said fixed jaw and, upon rotation, to permit said movable jaw to move outwardly away from said fixed jaw to permit said coupler to be disengaged from said tongue,
an upstanding ball on the rear portion of said coupler, and
co-operating means on said jaws and said tongue for preventing their vertical separation when said jaws are in closed position.

2. An assembly as claimed in claim 1, wherein said movable jaw has a bifurcated inner end for embracing the fixed jaw portion of said coupler.

3. An assembly as claimed in claim 2, wherein said cam means includes a vertical cam shaft extending through said fixed jaw portion of said coupler, said shaft carrying a cam lying in the plane of said fixed jaw portion.

4. An assembly as claimed in claim 3, including means for locking said jaws selectively in closed and open positions.

5. An assembly as claimed in claim 3 wherein an annular bushing of resilient material is interposed between said cam and said fixed jaw portion.

6. An assembly as claimed in claim 1, having co-operating V-shaped grooves and edges on the sides of said jaws and said rear tongue portion to maintain said tongue and coupler against vertical separation when said movable jaw is locked in closed position.

References Cited

UNITED STATES PATENTS

| | | | |
|---|---|---|---|
| 2,856,204 | 10/1958 | Graham | 280—491 |
| 2,877,025 | 3/1959 | Jay | 280—495 |
| 2,961,256 | 11/1960 | Hinrichsen et al. | 280—491 |
| 2,978,260 | 4/1961 | Hebeisen | 280—491 |

LEO FRIAGLIA, Primary Examiner

U.S. Cl. X.R.

280—495